(12) United States Patent
Postma et al.

(10) Patent No.: US 8,392,618 B2
(45) Date of Patent: Mar. 5, 2013

(54) ELECTRONIC SYSTEM AND A METHOD OF PROVIDING ADDITIONAL FUNCTIONALITY FEATURES TO AN ELECTRONIC SYSTEM

(75) Inventors: Andre Postma, Eindhoven (NL); Robertus Theodorus Christianus Deckers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1024 days.

(21) Appl. No.: 10/566,001

(22) PCT Filed: Jul. 16, 2004

(86) PCT No.: PCT/IB2004/051237
§ 371 (c)(1),
(2), (4) Date: Jan. 20, 2006

(87) PCT Pub. No.: WO2005/011135
PCT Pub. Date: Feb. 3, 2005

(65) Prior Publication Data
US 2008/0055102 A1   Mar. 6, 2008

(30) Foreign Application Priority Data

Jul. 24, 2003 (EP) .................................. 03102288

(51) Int. Cl.
*G06F 3/00* (2006.01)
*G06F 13/12* (2006.01)
*G06F 13/00* (2006.01)
*G06F 1/16* (2006.01)
*G06F 9/00* (2006.01)
*H04L 29/06* (2006.01)
*G05B 11/01* (2006.01)

(52) U.S. Cl. .............. 710/2; 710/8; 710/15; 710/62; 710/104; 710/300; 361/679.43; 713/1; 713/151; 340/12.25

(58) Field of Classification Search ................. None
See application file for complete search history.

(56) References Cited

U.S. PATENT DOCUMENTS

| | | | | |
|---|---|---|---|---|
| 5,517,324 A | * | 5/1996 | Fite et al. | 358/434 |
| 5,768,615 A | * | 6/1998 | Castell et al. | 710/2 |
| 5,799,068 A | * | 8/1998 | Kikinis et al. | 379/93.06 |
| 5,903,894 A | * | 5/1999 | Reneris | 707/100 |
| 5,920,270 A | * | 7/1999 | Peterson | 340/6.11 |
| 5,959,536 A | * | 9/1999 | Chambers et al. | 710/104 |
| 6,032,202 A | * | 2/2000 | Lea et al. | 710/8 |
| 6,072,412 A | * | 6/2000 | Abram et al. | 341/100 |
| 6,442,637 B1 | * | 8/2002 | Hawkins et al. | 710/300 |

(Continued)

FOREIGN PATENT DOCUMENTS

| | | |
|---|---|---|
| CN | 1395792 A | 2/2003 |
| EP | 1069694 A1 | 1/2001 |

(Continued)

*Primary Examiner* — Chun-Kuan Lee
*Assistant Examiner* — Henry Yu

(57) ABSTRACT

There is provided an electronic system (10) comprising one or more functionality devices (16, 20, 21) and an electronic device adapted so that the one or more functionality devices (16, 20, 21) are locatable in proximity to the electronic device. The electronic device is operable to recognize the presence of the one or more functionality devices (16, 20, 21). Upon recognition of said one or more functionality devices (16, 20, 21), the electronic device is operable to perform one or more additional functionality features associated with said one or more functionality devices while said one or more functionality devices are in close proximity to the electronic device.

20 Claims, 2 Drawing Sheets

U.S. PATENT DOCUMENTS

| | | | |
|---|---|---|---|
| 6,516,202 B1 * | 2/2003 | Hawkins et al. | 455/556.2 |
| 6,519,144 B1 * | 2/2003 | Henrie et al. | 361/679.43 |
| 6,522,613 B1 * | 2/2003 | Frankeny et al. | 720/655 |
| 6,581,157 B1 * | 6/2003 | Chiles et al. | 713/1 |
| 6,637,028 B1 * | 10/2003 | Voyticky et al. | 725/42 |
| 6,654,816 B1 * | 11/2003 | Zaudtke et al. | 710/1 |
| 6,772,331 B1 * | 8/2004 | Hind et al. | 713/151 |
| 6,804,825 B1 * | 10/2004 | White et al. | 725/87 |
| 6,813,661 B2 * | 11/2004 | Li | 710/62 |
| 6,931,463 B2 * | 8/2005 | Striemer | 710/62 |
| 6,967,588 B2 * | 11/2005 | Zustak et al. | 340/12.26 |
| 7,010,624 B1 * | 3/2006 | Zhou et al. | 710/8 |
| 7,218,243 B2 * | 5/2007 | Hayes et al. | 340/12.25 |
| 7,254,159 B1 * | 8/2007 | Lavelle et al. | 375/141 |
| 7,412,459 B1 * | 8/2008 | Johnson et al. | 1/1 |
| 7,424,707 B2 * | 9/2008 | De Boer et al. | 717/173 |
| 8,141,117 B1 * | 3/2012 | Coningsby et al. | 725/55 |
| 8,251,809 B2 * | 8/2012 | Griswold | 463/29 |
| 8,276,183 B1 * | 9/2012 | Hendricks et al. | 725/132 |
| 2002/0054024 A1 * | 5/2002 | Andres et al. | 345/168 |
| 2003/0038849 A1 * | 2/2003 | Craven et al. | 345/864 |
| 2003/0048295 A1 * | 3/2003 | Lilleness et al. | 345/738 |
| 2003/0051083 A1 | 3/2003 | Striemer | |
| 2003/0068034 A1 * | 4/2003 | Silvester | 379/433.12 |
| 2003/0114192 A1 * | 6/2003 | Estes et al. | 455/558 |
| 2003/0135868 A1 * | 7/2003 | DeGeorge | 725/152 |
| 2003/0167369 A1 * | 9/2003 | Chen et al. | 710/306 |
| 2003/0200371 A1 * | 10/2003 | Abujbara | 710/305 |
| 2004/0039860 A1 * | 2/2004 | Mills et al. | 710/301 |
| 2004/0080537 A1 | 4/2004 | Adler | |
| 2004/0198472 A1 * | 10/2004 | Kotzin | 455/575.1 |
| 2004/0216140 A1 * | 10/2004 | Hiltgen | 719/320 |
| 2004/0253944 A1 * | 12/2004 | Kelley et al. | 455/418 |

FOREIGN PATENT DOCUMENTS

| | | |
|---|---|---|
| EP | 1330075 A1 * | 7/2003 |
| EP | 1330075 B1 | 5/2008 |
| GB | 2325549 A * | 11/1998 |
| JP | 2003179821 A | 6/2003 |
| WO | 2005011135 A1 | 2/2005 |

* cited by examiner

ELECTRONIC SYSTEM AND A METHOD OF PROVIDING ADDITIONAL FUNCTIONALITY FEATURES TO AN ELECTRONIC SYSTEM

FIELD OF THE INVENTION

The present invention relates to electronic systems including one or more additional functionality features therein; moreover, the invention also relates to methods of providing additional functionality features to electronic systems, for example to a method of providing one or more additional functionality features to an electronic system by attaching one or more functionality devices thereonto.

BACKGROUND OF THE INVENTION

Electronic systems such as DVD players and televisions (TVs) are capable of providing to their one or more users a variety of standard functional features. A contemporary DVD player is naturally capable of providing to its one or more users not only standard features, such as play, pause, eject, but also a large variety of other non-standard features susceptible to being accessed and utilised. An example of a non-standard feature is to pause a film at a specific user determined point therein, and then zoom in on certain areas thereof; another example of a non-standard feature is to apply one or more "bookmarks" to certain points in a film. However, the number and variety of such non-standard features provided varies considerably between different models of electronic systems available on the market. A common feature of such electronic systems is that specific sets of functions are fixed for specific models of the systems. If a user wants another preferred set of functions or features, in addition or in substitution for one or more features standardly provided in a specific model of an electronic system, the user is often obliged to obtain another system having a set of features more to the user's liking. It is not generally possible to change the set of features on specific models of contemporary electronic systems.

In the European patent application no. EP 1 069 694, there is described a telecommunications system for downloading a different user interface to an electronic device. The system disclosed comprises a controller (gateway/server), several devices (TV, VCR, refrigerator, security system) and a remote control unit for remotely controlling the devices via the controller. An interface akin to a user-interface may be downloaded into the remote control unit, for example in response to a trigger-signal comprising a user identification. However, such a system is limited to a system comprising a telecommunication system and to the substitution of software control systems.

The inventors have appreciated that a more flexible method of providing additional functions and features to electronic systems is of benefit and have, in consequence, devised the present invention.

SUMMARY OF THE INVENTION

It is a first object of the present invention to provide electronic systems with additional functionality.

It is a second object of the invention to provide a method of upgrading standard electronic systems with additional functionality features.

According to a first aspect of the present invention, there is provided an electronic system comprising one or more functionality devices and an electronic device adapted so that the one or more functionality devices are locatable in proximity to the electronic device; the electronic device being operable to recognise the presence of the one or more functionality devices, and, upon recognition of said one or more functionality devices, the electronic device being operable to perform one or more additional functionality features associated with said one or more functionality devices whilst said one or more functionality devices are in proximity to the electronic device.

The invention is of advantage in that it is capable of addressing at least one of the objects of the invention elucidated in the foregoing.

Preferably, in order to render the one or more functionality devices more easily user-activatable, the system is arranged such that at least one of said one or more functionality devices is arranged to be attachable to the electronic device by means of at least one of a magnetic coupling, a suction pad, an adhesive coupling and a mechanical attachment mechanism.

Preferably, in order to render the system more easily useable to substantially technically unskilled users, at least one of said one or more functionality devices and the electronic device are operable to communicate via wireless communication by using an electromagnetic signal. More preferably, by using an electromagnetic signal complying with international electromagnetic signal standards, the electromagnetic signal may e.g. be implemented to comply with the Bluetooth standard.

Preferably, access to the one or more additional functionality features of said one or more functionality devices is conditional upon activation of the functionality device. Such activation is of benefit in that it is capable of providing for external regulation on use of said one or more additional features, for example by way of passwords. Such passwords are beneficially based around private-public key encryption technologies.

For ease of use to a wide range of users, said one or more functionality device is preferably activated in response to actuation of a switch or button on the device.

Where, for example, validation and/or authorisation is desirable, at least one of said one or more functionality devices is preferably activated by using electromagnetic signal communication with an additional device. More preferably, the activation is conditional upon communication of one or more codes. Such codes are preferably private-public key encryption type codes.

According to a second aspect of the present invention, there is provided a method of providing additional functionality to an electronic device, the method including the steps of:

(a) providing an electronic device operable to performing a set of functions;

(b) providing at least one functionality device adapted so as to be engagable in at least close spatial proximity to the electronic device;

(c) arranging for said electronic device to be capable of recognising the presence of said at least one functionality device when in close spatial proximity to the electronic device; and (d) arranging for the electronic device to perform one or more additional functionality features associated with said at least one functionality device brought into close spatial proximity whilst said at least one functionality device is maintained in close spatial proximity to said electronic device.

Preferably, in the method, close spatial proximity corresponds to physical contact between said electronic device and said at least one functionality device.

Preferably, in the method, said at least one functionality device is attached to the electronic device by means of at least one of a magnetic coupling, a suction pad, an adhesive coupling and a mechanical attachment mechanism.

Preferably, in the method, said at least one functionality device and said electronic device are arranged to mutually communicate via wireless communication utilizing an electromagnetic signal. More preferably, the electromagnetic signal corresponds to electromagnetic radiation complying with the Bluetooth standard.

It will be appreciated that features of the invention are susceptible to being combined in any combination without departing from the scope of the invention.

BRIEF DESCRIPTION OF THE DRAWINGS

Embodiments of the invention will now be described, by way of example only, with reference to the accompanying drawings, wherein.

DESCRIPTION OF PREFERRED EMBODIMENTS

Figure 1:
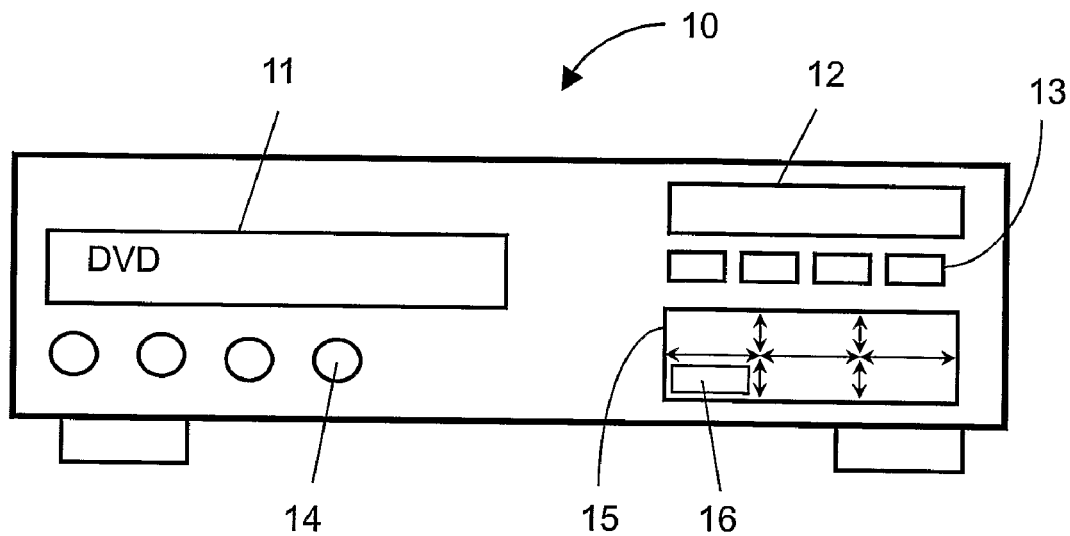
FIG. 1 is a schematic diagram of an electronic system according to the present invention.

The present invention is concerned with add-on features which are susceptible to being provided to electronic systems by way of one or more functionality devices added thereto. Such functionality devices are in a preferred embodiment of the invention physical buttons which are attachable to electronic systems, for example to DVD players, to TVs and to similar types of electronic apparatus.

The electronic systems are capable of being rendered operable to recognise the presence of one or more such attached buttons and change their functionality according to the buttons, for example, by way of Bluetooth wireless technology providing a communication link between the systems and their respective one or more attached buttons. Such changed functionality of the electronic systems is maintained whilst such one or more functionality devices, or one or more functionality buttons, remain attached and/or in close proximity to their respective electronic systems.

The inventors have appreciated that a DVD player, a TV, or any other electronic device may be fabricated so that a basic set of functionality features are available thereon; moreover, the inventors have further appreciated that, by attaching one or more functionality buttons, additional features are susceptible to becoming available whilst the one or more buttons remain attached. In a first embodiment, an electronic system is arranged so that it is capable of automatically recognising if a functionality button is attached thereto, and to subsequently update the available functionality features according to the nature of the functionality button. For example, the functionality button may contain a storage module, or an integrated circuit, and the additional features may be transferred from the storage module or the integrated circuit to the system. In another embodiment, the presence of the functionality button enables the electronic system to update its functionality by accessing an external storage medium; for example, whilst the button is attached to a DVD player, the player is susceptible according to the invention of updating its functionality from a DVD disc or through a communication connection to the Internet.

Some or all of the aforementioned additional features may already be latently present in the electronic systems, either originating from fabrication of the systems, or due to the fact that the functionality button has already been attached to the system before, and at that time the additional features were installed on, or provided to, the electronic systems. In such an embodiment of the present invention, the functionality feature is activated when attaching one or more buttons to the systems, the functionality feature remaining activated whilst the one or more buttons remain attached to the systems.

Some or all of the aforementioned additional features may alternatively only be present in the functionality device itself. In such an embodiment of the present invention, the functionality feature is not installed or transferred to the electronic device, but the electronic device is adapted to accept and carry out instructions from the functionality device. In this embodiment the functionality device contain processing hardware and software.

The added functionality to an electronic system may be due to the physical presence of the functionality device. Thus, the owner of the functionality device may activate the functionality on any compatible device, by detaching the functionality device from a first electronic device, and attaching the functionality device to another compatible device. The owner of the functionality device may thus carry the functionality device around with him.

The inventors have appreciated that a functionality button as described in the foregoing is a hardware analogy of downloadable software features for a software package. A user is thereby capable of extending the functionality of electronic systems easily by buying desired functionality buttons and adding them to the systems.

The present invention will now be further elucidated by describing embodiments of the invention illustrated in the drawings associated herewith.

In FIG. 1, there is shown a schematic drawing of an electronic system according to the present invention. The electronic system may be regarded as a modified electronic device, for example as a modified DVD device, namely a DVD device modified with respect to contemporary standard DVD devices. In FIG. 1, the electronic system indicated generally by 10 comprises a standard DVD device with a tray 11 for receiving a DVD disc, a display 12 for displaying data, and buttons 13, 14 for instructing the device to perform a variety of standard functions, for example such as "open tray", "start disc", "pause" and so forth. In addition to standard functions as provided on a contemporary DVD device, a button panel 15 is present, the panel 15 comprising several slots, for example six slots as illustrated, for inserting a functionality device 16.

Figure 3:
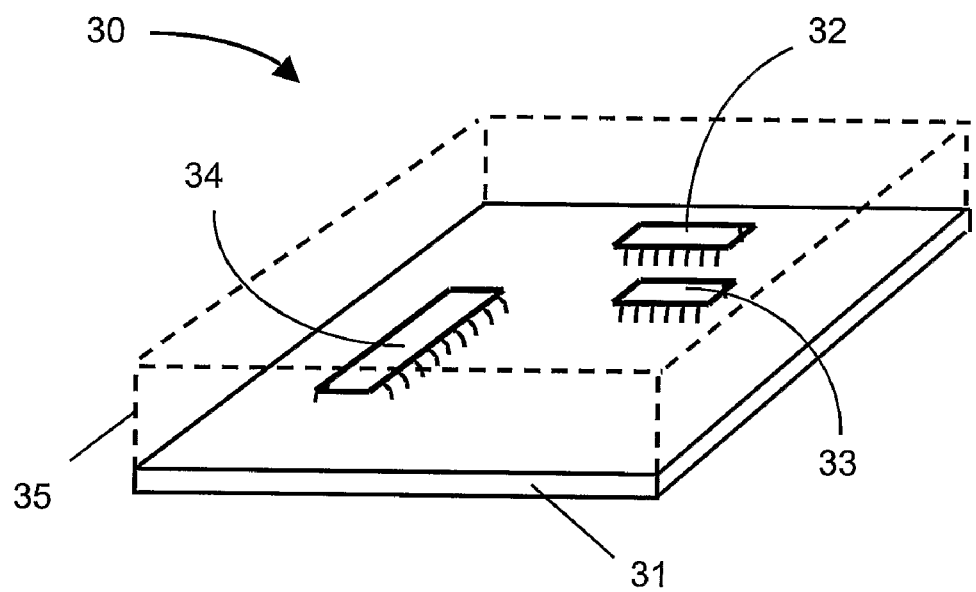
FIG. 3 is a schematic diagram providing an illustration of an interior inside region of a functionality device.
Figure 2A:
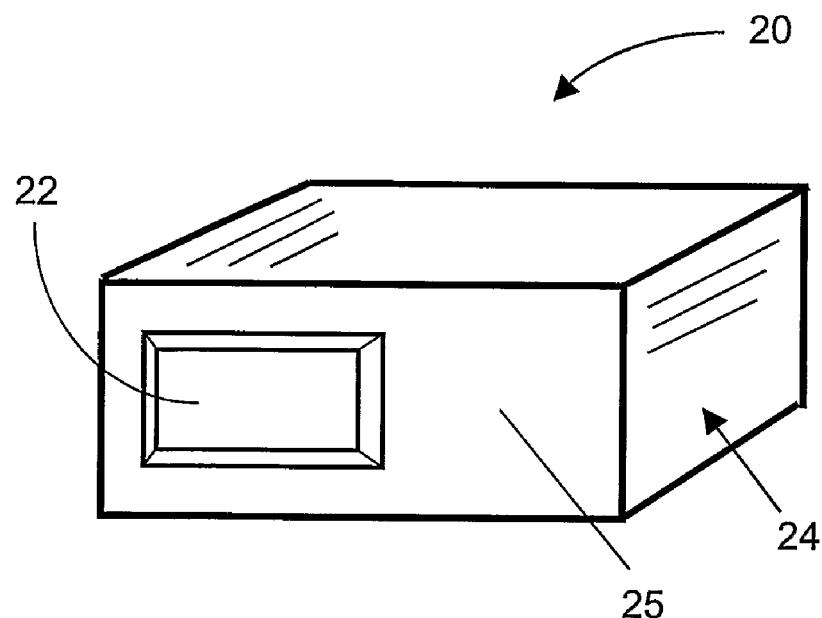
FIG. 2 is a schematic diagram of a functionality device susceptible to being added to an electronic system for providing it with additional functionality features.
Figure 2B:
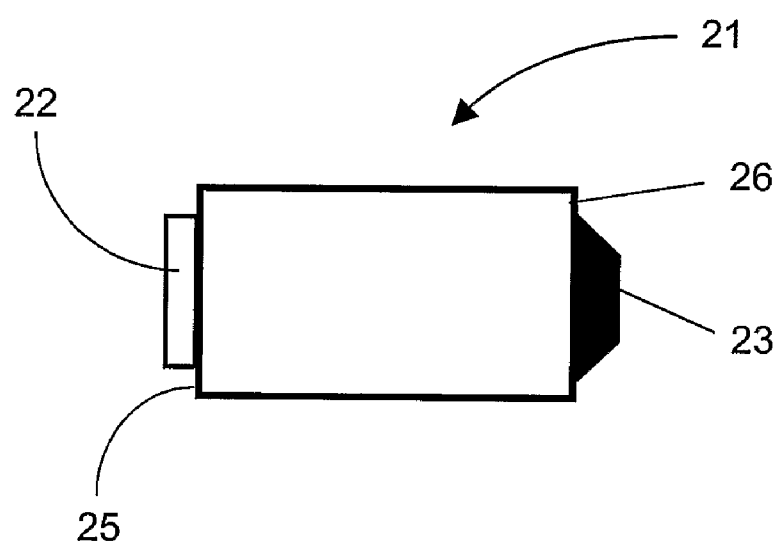

Referring now to FIGS. 2a, 2b and 3, there is illustrated a functionality device according to the present invention. In FIG. 2a, the functionality device is indicated generally by 20. The device 20 includes a protective housing indicated by 24, such a housing 24 providing an example of a possible form for packaging for the functionality device 20. Conversely, in FIG. 3, a housing is merely denoted by 35 in dashed outline, thereby focussing on some key components included within the functionality device.

In FIG. 2a, there is shown a perspective view of the functionality device 20, the device 20 comprising a front side 25 with an associated activation button 22, whereas in FIG. 2b, there is shown a side view of the functionality device 20 indicated generally by 21 illustrating a backside 26 with an attachment arrangement 23, for example a magnetic plate. An activation button may be provided in a situation where the user prefers not to have access to the functionality feature provided by the functionality device 21, but nevertheless prefers to keep the functionality device 21 attached to its associated electronic device. A magnetic plate on the functionality device 20, as well as a corresponding magnetic plate in the bottom of a slot, may constitute an arrangement for attaching the functionality device 20 to corresponding electronic apparatus. Other attachment arrangements are also feasible, for example, the backside 26 of the device 20 may be provided with a suction pad mount, an adhesive tape mount, a mechanical attachment mechanism, such as attachment pins, and/or any other type of mounting arrangement.

In FIG. 3, there is illustrated some key components comprised within a functionality device according to the invention, the device in FIG. 3 being indicated generally by 30. The device 30 includes a circuit board or plate 31 adapted to hold a plurality of components. The components may include an integrated circuit or a storage module 32 incorporating an additional functionality. Preferably, the integrated circuit 32 alternatively comprises routines for providing the additional functionality from another storage medium, such as a DVD disc, the Internet and so forth. The additional functionality is preferably communicated/controlled via Bluetooth wireless technology, and the functionality device may contain a Bluetooth transmission component 34 for transferring data. Activation of the functionality device may, alternatively to a push button as described in the foregoing, be done from a remote control, and the functionality device may contain a component 33 enabling communication between a remote control and the functionality device. Such activation may be further conditional upon entering an access code, the access code may be entered via the remote control. Activation via a code provides for operability of the functionality device being conditional upon the consent of the owner of the functionality device, thus making the functionality device a personal device, yet rendering it attachable to any electronic device that supports the feature of the button. In addition, the additional features may contain one or more elements which may be controlled via a remote control. For example, an additional functionality provided by a functionality device may be an image processing package, for example enabling a viewer of a DVD film to stop the film, to zoom in on an arbitrary area of the film by controlling an extent and position of the zoom area by the remote control, optionally executing some image processing function on the area by using specific buttons on the remote control, storing the zoomed and processed area, and then finally e-mailing the zoomed and processed area to a friend or colleague.

It will be appreciated that the invention is not limited to being implemented in a DVD device or a TV, namely any kind of electronic device may be envisaged, for example on CD players, radio devices, game consoles, VCRs and similar types of contemporary consumer electronic products.

Examples of the functionality which may be provided by the aforementioned functionality button have been provided in the foregoing; however, many other possibilities exist. In order to further elucidate the present invention, a brief non-exhaustive list will now be given.

A TV, a DVD, a game console for example supporting Internet connection, can be arranged such that the functionality button as described in the foregoing is operable to provide access to a specific website. The button preferably includes a universal resource locator, namely a URL, and possibly an identification key, namely an id-key, providing authorisation. Such an arrangement is, for example, susceptible to executing a movie download, a music download or other types of download. Moreover, such a functionality provides a new way of handling digital rights issues, for example copyright, as well as payment of services over the Internet. Internet users often have a reservation regarding payment over the Internet due to the uncertainty of the security involved when transferring credit card information.

A functionality button according to the invention is susceptible of including user preferences for an electronic device. In a situation where a user obtains a new and/or different electronic device which supports the functionality, the user preferences are susceptible to being transferred, for example by relocating the functionality button.

Many TV owners can only obtain access to different channels, for example satellite television channels, by buying a package which includes not only the TV channels of interest, but also numerous other TV channels of no interest to the TV owner. In a such a scenario, a functionality button according to the invention may be bought from the supplier of the TV channels, such that the functionality button is customised to the TV owners' specific preference for TV channels. A time limited access may also be provided, in this way a much larger number of TV owners may obtain access to view, for example, important sport events.

The invention is also susceptible to providing a time limited and/or channel specific access to a TV in, for example, a hotel. In hotels, it is customary to have to pay to obtain access to various services from a room TV. Access to the various services may be provided through a functionality button to the TV in the hotel room. The functionality button is conveniently, for example, issued from reception desks to new guests at hotels prior to the guests proceeding to occupy their respective hotel rooms.

The inventors have appreciated that DVD formats and digital movie formats in general, as well as audio formats, often change. Furthermore, the inventors have also appreciated that different frequency standards are used in different countries, and specific country codes may be applicable for digital movie and audio equipment. A functionality button according to the invention is susceptible to provide easy access to digital information of various standards and encoding. The functionality button implemented as a hardware button is also a practicable way envisaged by the inventors of handling digital rights issues involved in these aspects, for example issues of licensing and copyright.

It will be appreciated that embodiments of the invention described in the foregoing are susceptible to being modified without departing from the scope of the invention.

For example, the present invention is capable of being adapted to provide an alternative interface for an electronic device, e.g. an alternative remote control or TV interface. It is potentially useable to replace the interface associated with a consumer electronic device (CE device), i.e. to control the functionality of the buttons e.g. on a remote control.

As a further example, the present invention is adaptable to being used to play certain games via a CE device. The functionality feature according to the invention implemented as a functionality button is susceptible to holding a license key, and data such as users' high scores and settings which are permitted to be transported to other devices.

The functionality features of the present invention are not limited to those examples given in the foregoing, such that any kind of functionality within the spirit of the present invention may be envisaged.

Although the present invention has been described in connection with preferred embodiments thereof, it is not intended to be limited to the specific example form set forth herein. Rather, the scope of the present invention is limited only by the accompanying claims.

In the foregoing, it will be appreciated that reference to the singular is also intended to encompass the plural and vice versa. Moreover, expressions such as "include", "comprise", "has", "have", "incorporate", "contain" and "encompass" are to be construed to be non-exclusive, namely such expressions are to be construed not to exclude other items being present.

The invention claimed is:

1. An entertainment system comprising:
   one or more functionality devices; and
   an entertainment device for cooperating with the one or more functionality devices in the entertainment system, the entertainment device adapted so that the one or more functionality devices are locatable in proximity to the entertainment device;
   the entertainment device being operable to recognize the presence of the one or more functionality devices, and, upon recognition of said one or more functionality devices,
   the one or more functionality devices being externally activated, via a remote control device, wherein the activation is conditional upon communication of one or more security codes issued from the remote control to the one or more functionality devices being externally activated to provide external regulation on use of one or more additional functionality features to be performed whilst the one or more functionality devices is in proximity to the entertainment device,
   the one or more functionality devices comprising routines for providing said one or more additional functionality features from an external storage medium, wherein the additional functionality features are communicated from the external storage medium to the entertainment device via a wireless transmission component of the functionality device,
   the entertainment device being operable to perform the one or more additional functionality features associated with said one or more functionality devices and which are non-standard features of said entertainment device, wherein the additional functionality features are unrelated to and different from the standard features of the entertainment device, controllable via a remote control and performed whilst the one or more functionality devices is in proximity to the electronic device;
   wherein standard features of the entertainment device are configured to be concurrently operable with the one or more additional functionality features such that the entertainment device automatically recognizes, accepts, and carries out the non-standard features of the one or more functionality devices based on the proximity of the one or more functionality devices to the entertainment device.

2. The system according to claim 1, wherein at least one of said one or more functionality devices is arranged to be attachable to the entertainment device by means of at least one of a magnetic coupling, a suction pad, an adhesive coupling and a mechanical attachment mechanism.

3. The system according to claim 1, wherein at least one of said one or more functionality devices and the entertainment device are operable to communicate via wireless communication by using an electromagnetic signal.

4. The system according to claim 3, wherein the electromagnetic signal is implemented using electromagnetic radiation complying with the Bluetooth standard.

5. The system according to claim 1, wherein access to the one or more additional functionality features of said one or more functionality devices is conditional upon activation of the one or more functionality devices.

6. The system according to claim 5, wherein said one or more functionality devices are activated in response to actuation of a switch or button on said functionality devices.

7. The system according to claim 1, wherein at least one of said one or more functionality devices is activated by using electromagnetic signal communication with an additional device.

8. The system according to claim 5, wherein the activation is conditional upon communication of one or more codes.

9. A method of providing additional functionality to an entertainment device, the method including the steps of:
   providing the entertainment device operable to performing a set of functions;
   providing at least one functionality device adapted so as to be engagable in at least close spatial proximity to the entertainment device;
   arranging for said entertainment device to recognize the presence of said at least one functionality device when in close spatial proximity to the entertainment device; and
   externally activating the one or more functionality devices via a remote control device conditioned upon communication of one or more security codes issued from the remote control to the one or more functionality devices to provide external regulation on use of one or more additional functionality features to be performed whilst the one or more functionality devices is in proximity to the entertainment device, wherein the one or more additional functionality features are unrelated to and different from the standard features of the entertainment device,
   arranging for the entertainment device to perform the one or more activated additional functionality features associated with said at least one functionality device and which are non-standard features of said entertainment device;
   providing the one or more additional functionality features from an external storage medium, communicated from the external storage medium to the entertainment device via a wireless transmission component of the functionality device.

10. The method according to claim 9, wherein close spatial proximity corresponds to physical contact between said entertainment device and said at least one functionality device.

11. The method according to claim 9, wherein said at least one functionality device is attached to the entertainment device by means of at least one of a magnetic coupling, a suction pad, an adhesive coupling and a mechanical attachment mechanism.

12. The method according to claim 9, wherein said at least one functionality device and said entertainment device are arranged to mutually communicate via wireless communication utilizing an electromagnetic signal.

13. The method according to claim 12, wherein the electromagnetic signal complies with the Bluetooth standard.

14. The system according to claim 5, wherein the one or more additional functionality features are latently present in said entertainment device and access to said additional functionality is available while one or more functionality devices are attached.

15. The system according to claim 1, wherein a set of user preferences for an entertainment device is included on said one or more functionality devices.

16. The system according to claim 15, wherein said set of user preferences is transferable to a new entertainment device after relocating said one or more functionality devices to said new entertainment device.

17. The system according to claim 5, wherein the one or more additional functionality features are made available to said entertainment device from an external storage medium after attachment of the one or more functionality devices.

18. The system according to claim 1, wherein said entertainment device is selected from the group consisting of a DVD player and a television.

19. The method according to claim 9, wherein said entertainment device is selected from the group consisting of a DVD player and a television.

20. An entertainment system comprising:
   one or more functionality devices; and
   an entertainment device for cooperating with the one or more functionality devices in the entertainment system, the entertainment device adapted to recognize the presence of the one or more functionality devices when the one or more functionality devices are in proximity to the entertainment device,
   the one or more functionality devices comprising routines for updating functionality features of the entertainment device by accessing an external storage medium via the one or more functionality devices via a wireless transmission component of the one or more functionality devices.

* * * * *